United States Patent [19]
Wan

[11] Patent Number: 5,379,341
[45] Date of Patent: Jan. 3, 1995

[54] DEVICE FOR REMOTELY RESETTING ELECTRONIC APPLIANCES IN RESPONSE TO TELEPHONE RINGS

[75] Inventor: Larry S. Wan, Austin, Tex.

[73] Assignee: Odessa Engineering, Inc., Austin, Tex.

[21] Appl. No.: 78,432

[22] Filed: Jun. 16, 1993

[51] Int. Cl.$^6$ .................................... H04M 11/00
[52] U.S. Cl. .................................. 379/102; 379/105
[58] Field of Search ................ 379/102, 104–107, 379/90; 395/575, 750; 340/825.38, 825.66

[56] References Cited

U.S. PATENT DOCUMENTS

| | | | |
|---|---|---|---|
| 3,360,777 | 12/1967 | Kolm | 379/102 |
| 3,702,904 | 11/1972 | Bard | 379/105 |
| 3,783,193 | 1/1974 | Lee | 379/102 |
| 3,876,836 | 4/1975 | Langan . | |
| 4,021,615 | 5/1977 | James et al. | 379/102 |
| 4,051,326 | 9/1977 | Badagnani et al. | 379/105 |
| 4,232,195 | 11/1980 | Bartelink | 379/105 |
| 4,304,967 | 12/1981 | Gretczko | 379/105 |
| 4,438,295 | 3/1984 | Hales | 379/105 |
| 4,467,144 | 8/1984 | Wilkerson et al. . | |
| 4,647,721 | 3/1987 | Busam et al. | 379/102 |
| 4,686,526 | 8/1987 | Gritzo | 340/825.06 |
| 4,723,269 | 2/1988 | Summerlin | 379/105 |
| 4,845,773 | 7/1989 | Attallah | 379/102 |
| 4,878,196 | 10/1989 | Rose | 379/102 |
| 4,996,706 | 2/1991 | Cho | 379/93 |

FOREIGN PATENT DOCUMENTS

| | | | |
|---|---|---|---|
| 1206637 | 6/1986 | Canada | 379/104 |
| 3213217 | 10/1983 | Germany | 379/102 |
| 52-19011 | 2/1977 | Japan | 379/102 |
| 1594931 | 8/1981 | United Kingdom | 379/102 |
| WO85/03159 | 7/1985 | WIPO | 379/105 |

OTHER PUBLICATIONS

J. Guilder, "Turn-On Appliances Via Long Distances" Radio Electronics, vol. 48, No. 4, Apr. 1977.
Vant Systems, Inc., "Remote Access Call In Control"; Date Unknown; 3 pages.
ALM, "Intelestrip 800"; Publication Date Unknown; 2 pages received date 11/18/91.
Barr, "Power ON Wakes Up Remote PCs"; PC Magazine, Apr. 16, 1991; p. 50.

*Primary Examiner*—Wing F. Chan
*Attorney, Agent, or Firm*—Malin, Haley, DiMaggio & Crosby

[57] ABSTRACT

An apparatus is disclosed which is controlled by telephone rings over a telephone line and used to momentarily interrupt power to a computerized appliance. The apparatus waits for a preset number of rings, which are accumulated over one or more unanswered calls. The ring count is cleared if consecutive rings from separate calls are not received within a selectable time of each other. Once the preset count level is reached, the apparatus automatically turns the power to the appliance off for a period of time and then back on again. Because the apparatus may accumulate the necessary number of rings from separate telephone calls, it can be used on a telephone line to which an answering device, a modem for example, is connected, even though that device persists in inhibiting telephone rings by answering before the number of rings needed to activate the apparatus is reached on each call. A second telephone line may be connected to the apparatus and used in place of the first telephone line in the case when the first telephone line is busy and cannot accept telephone rings.

20 Claims, 4 Drawing Sheets

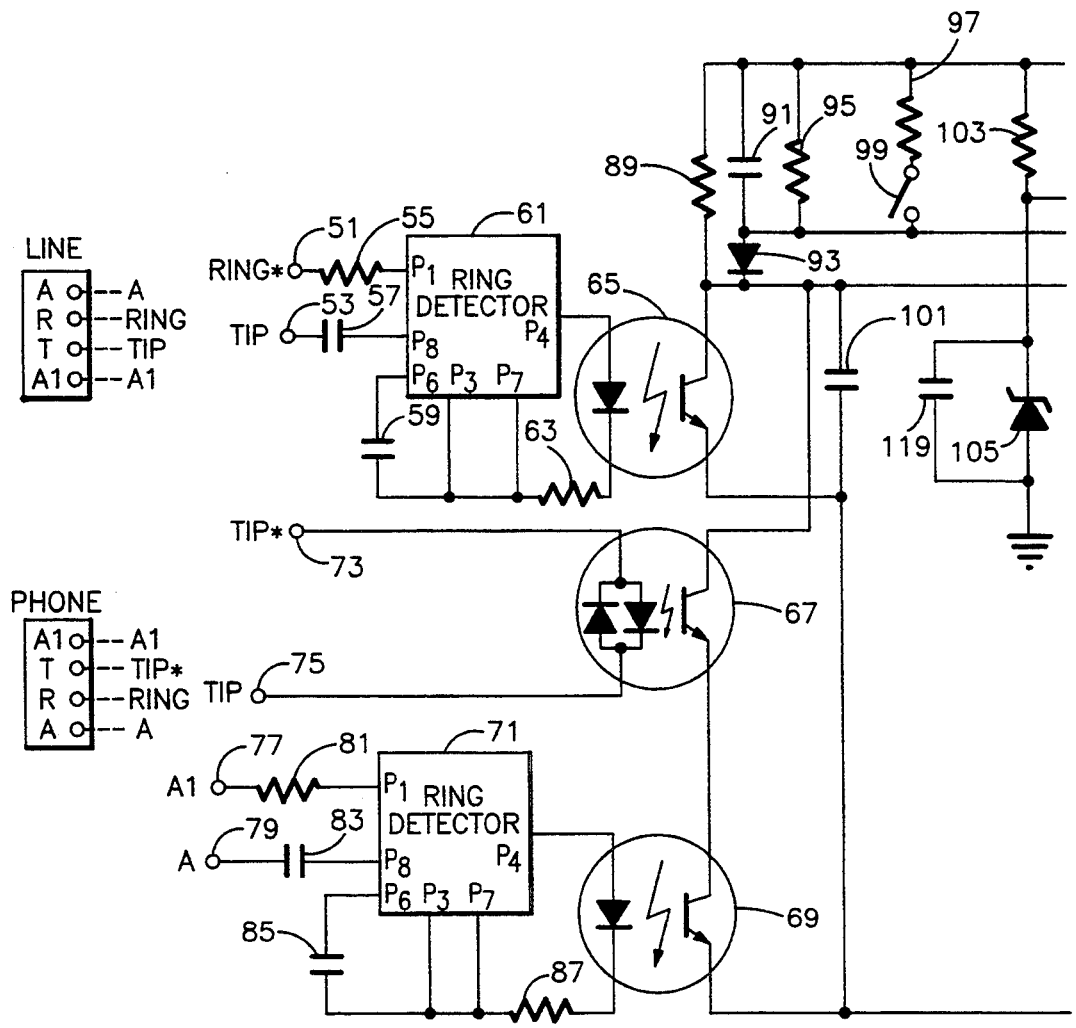
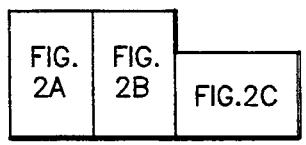
FIG.2A
FIG.2

DEVICE FOR REMOTELY RESETTING ELECTRONIC APPLIANCES IN RESPONSE TO TELEPHONE RINGS

BACKGROUND OF THE INVENTION

1. Field of the Invention

The present invention relates to a device for resetting a computer system after lockup has occurred. More particularly, it relates to an electronic multi-line telephone control device which interrupts electrical power for a predetermined period of time in order to reboot an externally-operated computerized appliance.

2. Description of the Prior Art

Many different electronic systems have been developed for unattended operation at a remote location. One specific application is that of a modem used to allow access to a computer via a telephone line. From time to time, various factors cause a "lockup" of the computer, which renders it inoperative and inaccessible. Lockup occurs when the computer becomes disabled due to problems in reading or running various software programs. The software can deactivate the computer by becoming involved in an infinite loop or can become temporarily inoperative due to incorrect parameters entered by the user. Additionally, the computer may also incorrectly read program code into RAM from the computer hard disk or floppy disk.

Often, when lockup occurs, the only recourse is to reboot the computer and start afresh. Rebooting involves actually switching electrical power to the computer off and then on again. This ultimately clears or erases any software code stored in non-static RAM. The software code can then be read back into RAM from either the computer firmware in ROM, the system hard disk drive, or from floppy disks, and automatically restarted.

Special problems occur when the computer system is remotely operated by modem since no operator is present to reboot or reload software when the computer is in lockup. While in lockup, the computer is virtually useless and a trip must be made to the remote site in order to reboot the system. This results in much lost user time which can be inconvenient and expensive. Once the computer is rebooted, contact with users may then be re-established via an attached telephone modem.

Many different types of devices have been devised in order to remotely control computers and their peripherals such as modems, printers, etc. These devices operate primarily to turn on or off the computer peripheral by using a telephone line. The systems operate either through the use of telephone ring detection or specialized circuitry to detect DTMF tones dialed from the keypad of the telephone and typically use only one telephone line. If a computer is in lockup, the telephone line connecting the modem may also stay busy because the modem will not release or hang up the line. Under these conditions, a user cannot even use the telephone line to activate a remote device to turn off the computer.

For example, U.S. Pat. No. 3,876,836 issued to Langan relates to a remote control apparatus which utilizes a predetermined number of telephone rings to provide control effects at a remote site. A command or order to the apparatus in the form of telephone rings, from a user, is registered at a remote location by a counter. The counter activates a timer for setting up an inhibiting period. At the end of the inhibiting period, the counter is reset. A count of one (one ring) applied to the circuit activates an electrical outlet for turning on the remote device while two rings act to de-energize the electrical output for turning the device off.

This type of device has distinct disadvantages in that multiple rings equal to more than a preset count will not activate the device. The device uses only one telephone line, so if the line is busy, activation or deactivation is not possible. Further, this circuit will not accumulate rings over multiple or successive phone calls. Most importantly, the circuit does not "interrupt" the electrical power of the device. Interruption occurs when the device is turned off and then after an elapsed period automatically turned back on. This circuit merely turns the device off without automatically turning it back on after any predetermined set time. A completely separate procedure is required in order to reactivate the device.

U.S. Pat. No. 4,845,773 issued to Attallah also discloses a system for remotely switching electrically-operated devices using calling signals generated by a telephone. A detection circuit identifies a specific code of a telephone calling sound signal, and validates a predetermined number of such calling sound signals to determine if a switching function is to be performed. The user causes the telephone to generate a first series of repetitive calling signals, followed by a delay period and then further calls to generate a second series of repetitive calling signals, thereby causing a processing circuit to validate the calling signals.

U.S. Pat. Nos. 4,467,444 to Wilkerson, 4,996,706 to Cho, and 4,686,526 to Gritzo further disclose apparatus for controlling remotely-located devices through the use of ringing signals. Wilkerson operates by plugging the device into a wall outlet for switching AC power to the remote activation device. Cho relates to a method for controlling the power supply to a modem for transmitting or receiving data between a telephone and computer. The device operates so as to allow power to be supplied to the modem only when the user desires to transmit or receive data via the modem. When the modem is not in use, it is placed in a standby mode to decrease the power consumption and prevent generation of undesirable electromagnetic radiation. The patent to Gritzo relates merely to a computer reset system that acts as a stand-alone monitor and controller by clocking in each character sent by a terminal to a computer and comparing it with a given reference character. The reset circuit activates in response to detection of a proper condition or match.

SUMMARY OF THE INVENTION

To achieve the foregoing and attain the objects in accordance with the present invention as embodied and broadly described herein, the present invention solves the aforementioned lockup problem by providing an electronic device which activates and interrupts the lockup for a predetermined period via an electrical power strip or an internal 8-bit PC card. The interruption circuit of the present invention can be set to activate and either interrupt electrical power supplied through the power cord or reboot the computer via the reset points on the computer motherboard. The apparatus is set by the user to operate, e.g. momentarily interrupt electrical power, at a point anywhere in a range between 2 to 8 accumulated telephone rings when each new ring occurs within a preselected timeout period of either 30 seconds or two minutes of the previous ring.

The interruption circuit of the present invention offers distinct advantages over the prior art devices in three ways.

First, if an unattended computer system or network server is "hung up," the interruption circuit of the present invention allows the unattended computer system to be rebooted with a long series of telephone rings to a telephone line connected to the device. The device counts the number of rings on the telephone line and interrupts electrical power to the computer for a predetermined period after the correct number of rings are registered.

Secondly, if a host computer which is accessed via remote dial-in access software locks up while a user is on-line, and the modem continues to answer, control of the host cannot be obtained if, for example, the modem answers within three rings and a deactivation circuit is set at four rings. To avoid this problem and activate the interruption circuit, the present invention allows the user to call twice on the primary telephone line, hanging up after two rings on each call. A built-in memory within the interruption circuit retains the first two rings in memory and then continues counting so that the subsequent two rings from the second telephone call will activate the interrupt circuit. The memory has then registered a four-ring count, witch two rings from the first call and two rings from the second. The interrupt circuit temporarily interrupts power to the computer, allowing the computer to reboot.

Finally, a Bulletin Board System (BBS) computer or node may stop answering, perhaps due to an unexpected sequence of commands, or because the computer gets lost in a DOS shell. A BBS user attempting to reach the disabled BBS or node will unknowingly generate sufficient telephone rings to activate the interrupt circuit. The BBS or node will thorn be rebooted and the system will answer on subsequent attempts.

Accordingly, it is the object of the present invention to provide a deactivation circuit which deactivates an electrical power source for a predetermined period when a user-selected number of rings actuate the device.

It is a further object of the invention to provide a computer reset circuit available as an internal PC card or integrated into a power supply circuit which will monitor rings on a telephone line and can be set to activate after a user-set number of accumulated rings, as long as each new ring occurs within a preselected timeout period of the previous ring. Upon activation, the interruption circuit deactivates electrical power momentarily and only for a predetermined period in order to reboot an externally-operated computer system.

It is still a further object of the present invention to provide a power interruption circuit that does not need to answer telephone calls to be activated and can store in memory the number of rings received by the device over an attached telephone line when each subsequent call is received before the expiration of a preselected time.

It is a further object of the invention to provide a power interruption circuit which activates upon receipt of a user-selected number of accumulated telephone rings over primary or secondary telephone lines when each subsequent call is received before the expiration of a preselected amount of time.

It is still a further object of the invention to provide a power interruption circuit that will not compete with other answering devices for control of a computer system and does not have any of the complications of voice-path telephone interface audio circuitry or tone decoders, and can be activated merely by counting the number of telephone rings accumulated from one or more unanswered telephone calls, which rings are received within a preselected period of time of each other.

These and other objects, advantages, and features of this invention will become apparent upon review of the following specification in conjunction with the drawings.

BRIEF DESCRIPTION OF THE DRAWINGS

FIGS. 2, 2A, 2B, and 2C illustrate schematic diagrams of the first, second, and third portions of the power interruption circuit shown in FIG. 1.

DESCRIPTION OF THE PREFERRED EMBODIMENTS

Circuit Description

Figure 1:
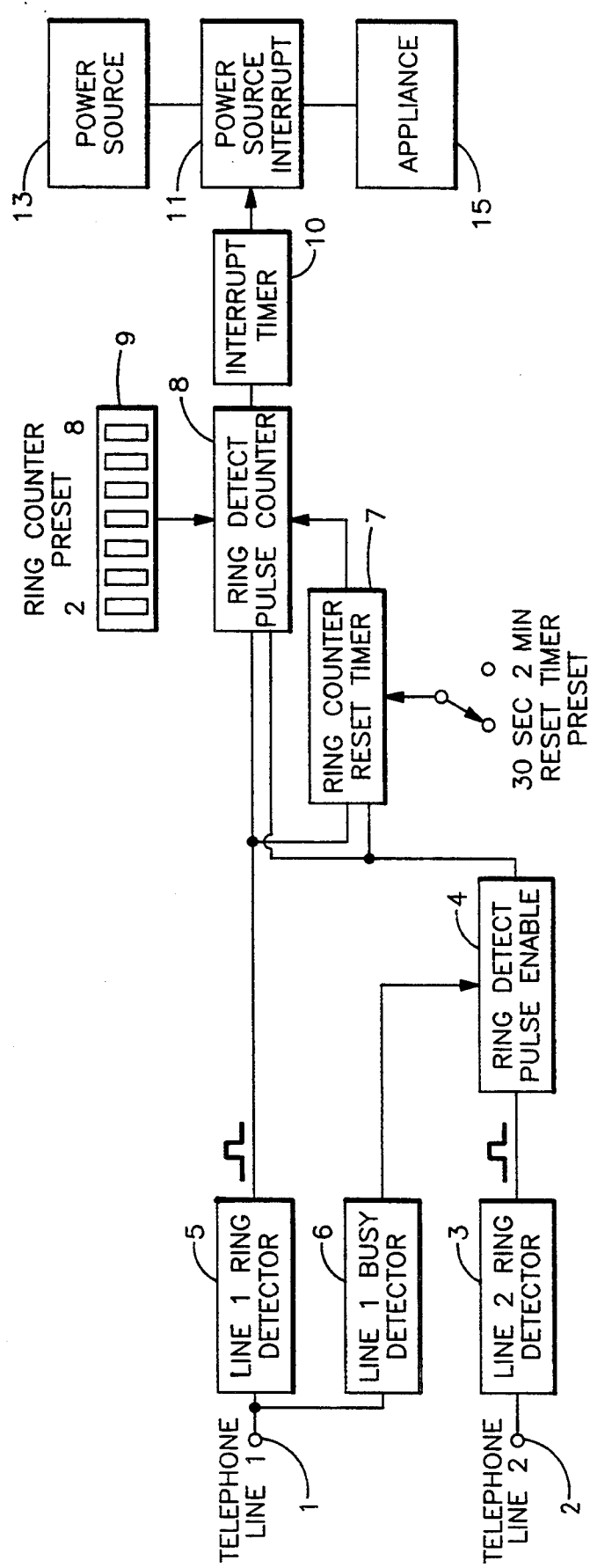
FIG. 1 illustrates a block diagram of the power interruption circuit.

FIG. 1 illustrates a block diagram showing the general operation of the present invention. Specifically, a first ring detector 5 is connected to a first telephone line 1. Ring detector 5 detects telephone rings on the telephone line and generates from each ring a pulse which triggers ring counter reset timer 7 and ring detect pulse counter 8. Ring detect pulse counter 8 counts the number of pulses, i.e. rings detected by the line 1 ring detector 5. A ring counter preset 9 allows a user to select from a range of 2 to 8 accumulated rings before activating interrupt timer 10. Ring counter reset timer 7 further allows a user to set a timeout period at either 30 seconds or 2 minutes. The timeout period begins anew after each telephone ring is detected by ring detector 5. If a subsequent ring, if any, is not received by ring detect pulse counter 8 within this timeout period, the ring detector pulse counter 8 is reset and begins counting again from zero rings.

In the event line 1 is busy or locked up, this status is detected by line 1 busy detector 6, which triggers ring detect pulse enable 4 to allow pulses generated from rings detected by a second ring detector 3 on a second telephone line 2 to trigger ring counter reset timer 7 and ring detect pulse counter 8. This method allows a user to activate the power interruption circuit using an unoccupied secondary telephone line 2.

When the user-selected number of accumulated rings has been reached by ring detect pulse counter 8, interrupt timer 10 is activated. Interrupt timer 10 actuates power source interrupt 11 for about 10 seconds. Power source interrupt 11 disconnects an attached appliance 15 from power source 13. In accordance with the invention, this is generally a computer or any type of system with a CPU that can automatically load and run program code when switched on. After the power interruption period has expired, interrupt timer 10 is automatically deactivated and the electrical power from power source 13 is automatically reconnected to appliance 15 by power source interrupt 11.

Referring now to FIGS. 2, 2A, 2B, and 2C, these show the detailed schematic diagram of the interruption circuit shown in FIG. 1.

The interruption circuit can be essentially divided into five units or modules, namely, ring detector, ring counter, relay driver, interrupt timer, and power supply.

FIG. 2A depicts the ring detector module, comprised of ring detectors 61 and 71. Ring detector 61 is attached to a first telephone line which includes ring line 51 and tip line 53. The ring detectors 61 and 71 are TCM1520A, manufactured by Texas Instruments, Inc. Ring detector 71 is attached to a second telephone line with ring line 77 and tip line 79. The ring detector module further includes optoisolators 65, 67, and 69, attached to the ring detectors 61 and 71. Optoisolators 65 and 69 are TIL181, manufactured by Texas Instruments, Inc., while optoisolator 67 is an AC-input optoisolator TIL186-4, manufactured by Texas Instruments, Inc. The optoisolator is a coupling device in which an infrared emitting diode (IRED), energized by an input signal, is optically coupled to a photodetector. A photodetector or phototransistor merely acts as a switch to start or stop current flow. The optoisolators used are particularly applicable in low-voltage situations such as that provided by the first and second ring detectors. Optoisolator 67 works in a unique manner so as to allow optoisolator 69, along with ring detector 71, to provide a low-voltage pulse to decade counter divider 107 in the event the telephone line connected to ring detector 61 is in a busy state. The ring detector module further is associated with resistors 55, 63, 81, 87, and 89, and capacitors 57, 59, 83, 85, and 101.

Figure 2B:
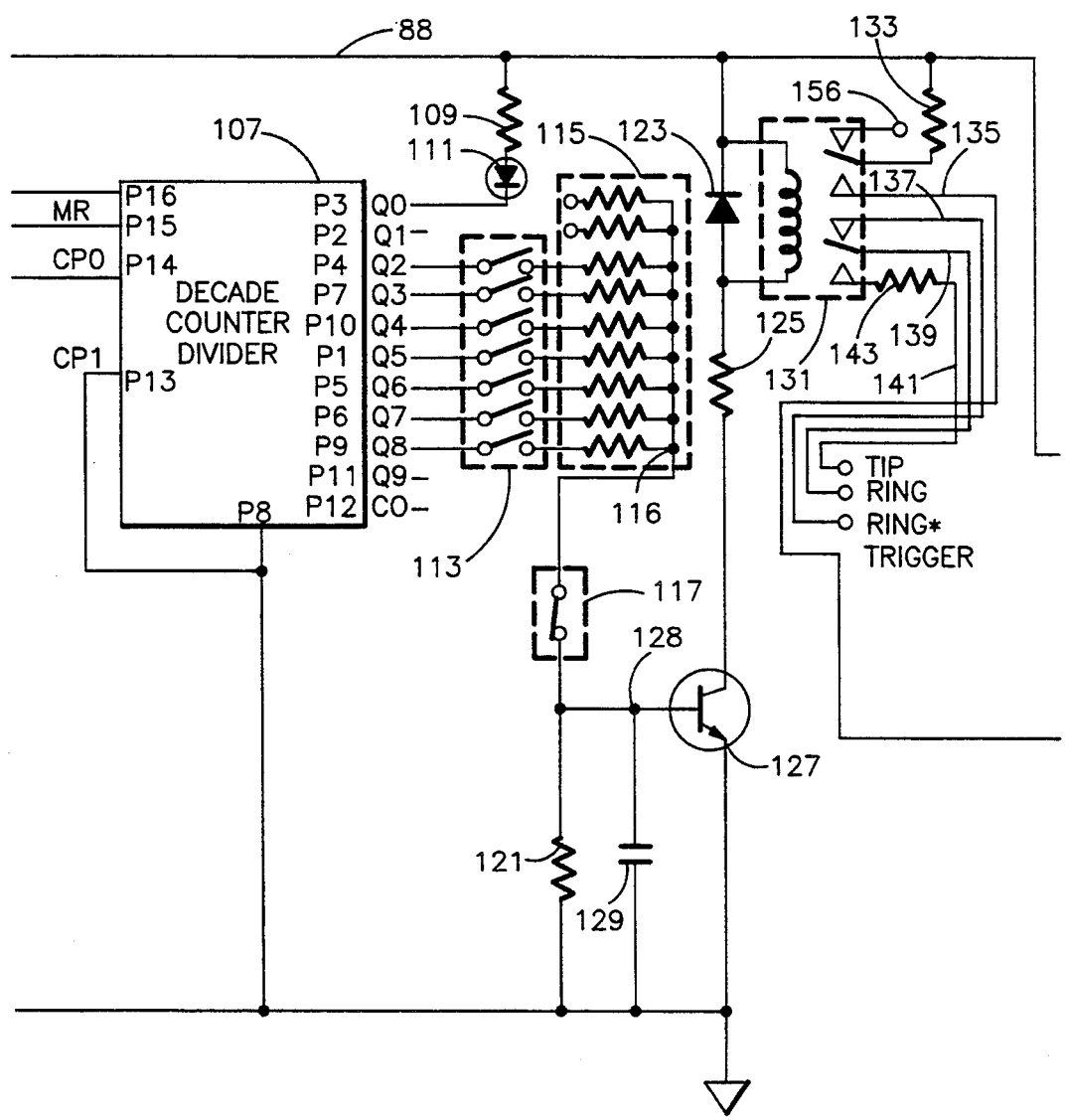

FIG. 2B depicts the ring counter module, comprised of decade counter divider 107, switches 113, and current limiter 115. Decade counter divider 107 is CD4017B, manufactured by the Harris Corp. The ring counter module further is associated with resistors 95, 97, 103, and 109, capacitors 91 and 119, and an LED 111. Additionally, the module is associated with diode 93, zener diode 105, and a single pole switch 99.

The ring counter module is further connected via a two-pin jumper 117 to a relay driver module, comprised of switching transistor 127 and relay 131, which provides a triggering pulse to the interrupt timer module. The relay 131 is G6A-274P-ST-US, manufactured by Omron Electronics, Inc. The relay driver module further includes resistors 121, 125, 133, and 143, capacitor 129, and a diode 123.

Figure 2C:
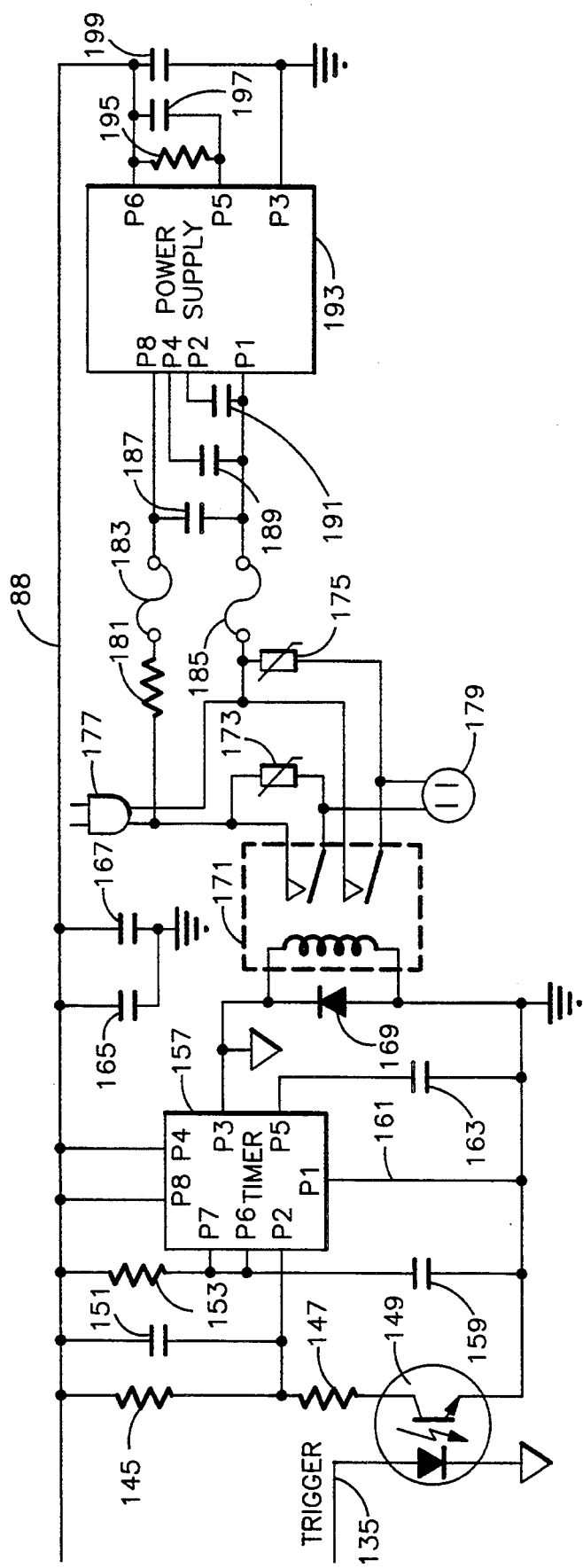

Further, FIG. 2C depicts the interrupt timer module, comprised of a standard 555 series timer 157, NE555N, manufactured by Motorola, Inc. Timer 157 is actuated by an additional optoisolator 149. This optoisolator is of the same type used as optoisolators 65 and 69 and is specifically applicable to detect a low-voltage pulse from the relay driver. The timer module further includes relay 171, which acts in combination with the timer in order to temporarily disconnect AC power supplied from male AC power plug 177 to a female AC power receptacle 179. The interrupt timer module further includes resistors 145, 147, and 153. It also includes capacitors 151, 159, 163, 165, and 167. Additionally, a diode 169 shunts across the relay 171 while varistors 173 and 175 each shunts a normally-closed contact in relay 171.

A power supply module comprised of a power supply chip 193, model HV2405E5, manufactured by the Harris Corp., is connected to an AC power source through fuses 183 and 185. The power supply chip 193 provides a regulated 12-volt DC power source to the interruption circuit. The power supply module further includes resistors 181 and 195, and capacitors 187, 189, 191, 197, and 199.

Operation

The first ring detector 61 is coupled to the first telephone line through resistor 55 and capacitor 57. The telephone ring signal ifs typically between 40 VAC and 150 VAC at 16 Hz to 68 Hz. The ring detector supplies 5 VDC at the output when the ring signal is present between the telephone ring and tip lines. Each telephone ring charges capacitor 59, which energizes the IRED in optoisolator 65 with current flow through resistor 63. This supplies base current to the phototransistor in optoisolator 65 to forward-bias the phototransistor.

The second ring detector 71 functions similarly in that, upon receipt of a telephone ring on a second telephone line, capacitor 85 is charged. The IRED initiates base current in the phototransistor of optoisolator 69.

Ring detectors 61 and 71, along with optoisolators 65, 67, and 69 and associated components, constitute the ring detectors, busy detector, and ring detect pulse enable shown in FIG. 1.

Each telephone ring on the first telephone line 51, 53 activates decade counter divider 107 through the clock pulse line CP0. A telephone device (not shown) such as a computer modem connected through optoisolator 67 would answer and utilize the first telephone line. AC-input optoisolator 67 allows telephone rings on the second or backup telephone line to activate the decade counter divider 107 when the first telephone line is in use.

Decade counter divider 107 may be triggered by an incoming telephone ring either by optoisolator 65 or, in the alternative, by the combination of optoisolator 67 and optoisolator 69 when the first telephone line 1 is in a busy state. This process begins when capacitor 101, charged through resistor 89 between telephone rings, slows down the trigger edge of the DC pulse which is generated. This serves to merge bursts of closely-spaced short rings used outside of the United States. Two or three short rings would then have the effect of one longer telephone ring.

Secondly, capacitor 91 is charged through diode 93, then discharges through resistor 95 or the combination of resistor 95 and resistor 97 if switch 99 is in a closed position. This provides either a two-minute (switch 99 open) or 30-second (switch 99 closed) time-delayed reset of the decade counter divider 107. Although 2-minute and 30-second intervals have been selected, any timeout period is possible through the proper RC combination between resistors 95, 97 and capacitor 91.

Finally, the decade counter divider 107 is clocked at pin CP0 and advances sequentially through the ten outputs. One of the switches at outputs Q2 through Q8 is preset closed to activate transistor 127 through one of the corresponding current-limiting resistors in the current-limiter 115 at a user-selected number of telephone rings. Only the respective switch which represents the number of accumulated rings needed to activate the device need be in the closed position. Each ring, beginning with the second, sequentially brings each output Q2 through Q8 to a high state. The individual switch that is closed will be the switch that conducts base current to transistor 127.

When base current is supplied through common circuit lead 128, relay 131 is energized through transistor 127. One pair of contacts passes a trigger current to optoisolator 149 (FIG. 2C) through resistor 133. The second pair of contacts in relay 131 shunts resistor 143 across the phone line, effectively going off-hook to answer the telephone call.

When the timer module is triggered through optoisolator 149, capacitor 151, which is held discharged by resistor 145, is then charged after a sub-second delay through resistor 147. This action then actuates timer 157 to start a 10-second delay, governed by capacitor 159 and resistor 153, which energizes relay 171, while simultaneously removing power from the decade counter divider 107 and relay 131. The pair of normally-closed contacts on relay 171 interrupts the AC power to the controlled appliance, for example, a computer, and provides a power off and on cycle. After expiration of the timer cycle, relay 171 is de-energized, closing the contacts in the relay and restoring AC power to the female receptacle 179. Varistors 173 and 175 operate to suppress any surges caused by this power interruption.

The variable-input AC-to-DC power supply module, fused by fuses 183 and 185, uses power supply 193 to convert voltages from 28 to 264 volts AC into 12 volts DC for the other components in the circuit. As discussed above, DC power is supplied through the DC potential line 88. Capacitors 199, 163, 165, 119, and 167 act to decouple the local supply voltage to ground.

Changes and modifications in the specifically described embodiments can be carried out without departing from the principles of the invention, which is intended to be limited in the scope of the appended claims, as interpreted according to the principles of patent law, including the doctrine of equivalents. The instant invention has also been shown and described in what is considered to be the most practical and preferred embodiment. It is recognized, however, that departures may be made therefrom within the scope of the invention and that obvious modifications will occur to a person skilled in the art.

What is claimed is:

1. A switching system for switching a power source operating a remotely located appliance through the use of an enabling signal delivered over a telephone line comprising:
    a first ring detector for detecting telephone electrical ring pulses on a first telephone line;
    a ring counter which is triggered by said ring detector for accumulating a number of telephone electrical ring pulses which occur in succession within a preselected amount of time of each other;
    a relay driver associated with said ring counter for providing an interrupt pulse; and
    a timer attached to said relay driver and actuated by said interrupt pulse for activating a switching means to momentarily interrupt said power source operating said appliance.

2. The switching system according to claim 1, wherein said appliance comprises a CPU that can automatically load and run program code when it is switched on.

3. The switching system according to claim 1, wherein said ring counter is set by a user to count telephone electrical ring pulses and trigger at a number between an upper and lower limit.

4. The switching system according to claim 3, wherein said upper limit is 8.

5. The switching system according to claim 3, wherein said lower limit is 2.

6. The switching system according to claim 1, wherein said preselected period of time between consecutive telephone electrical ring pulses is chosen between 30 seconds and two minutes.

7. The switching system according to claim 1, wherein said interruption of a power source includes deactivating said source and automatically reactivating said source after a predetermined period of time.

8. The switching system according to claim 1, further including a second ring detector for detecting electrical ring pulses on a second telephone line wherein said second ring detector activates said ring counter when said first telephone line is in a busy state.

9. The switching system according to claim 8, wherein said electrical pulses counter acts to accumulate a ring count over both said first and said second telephone lines and activates said relay driver if said accumulated number of electrical ring pulses reaches a user-selected number.

10. A method of interrupting power to an appliance including the steps of:
    detecting a user-selected number of telephone electrical ring pulses on an attached telephone line; and
    interrupting power to said appliance momentarily when said user-selected number of telephone electrical ring pulses is reached.

11. The method according to claim 10, wherein said interrupting step includes the step of disconnecting said power for a predetermined period of time and then further, automatically reconnecting said power to said appliance.

12. The method according to claim 10, further including the step of counting the number of incoming telephone electrical ring pulses and preselecting by a user the number of electrical ring pulses required to interrupt said power.

13. The method according to claim 10, further including the step of resetting a counting means after a preselected period of time when one or more telephone electrical ring pulses have been detected, but said user-selected number of telephone electrical ring pulses has not been reached.

14. The method according to claim 13, wherein said resetting step includes the step of preselecting by a user the time period before said counting means is reset.

15. The method according to claim 10, further including the step of selecting by a user from a range between an upper and lower limit the number of telephone electrical ring pulses before said appliance is interrupted.

16. The method according to claim 10, wherein said appliance is a computer system.

17. The method according to claim 10, wherein said step of detecting includes the step of counting said telephone electrical ring pulses on both a first attached and a second attached telephone line.

18. The method according to claim 17, wherein said step of interrupting includes interrupting power to said appliance using said second telephone line when said first telephone line is in a busy state.

19. A method to control a power interruption circuit using telephone electrical ring pulses to a telephone line, to which is connected a device that persists in answering, including the steps of:
    detecting telephone electrical ring pulses on the telephone line;
    accumulating the telephone electrical ring pulses over several separate telephone calls, thereby bypassing the device that persists in answering; and activating the power interruption circuit to momentarily disconnect power to said device when a user-selected number of telephone electrical ring pulses are reached.

20. A method of generating a triggering signal at a remote location, comprising the steps of:

detecting electrical ring pulses on a first telephone line;

detecting electrical ring pulses on a second telephone line when said first telephone line is in a busy state;

generating a triggering signal in response to a predetermined number of electrical ring pulses detected over said first and second telephone lines for activating a power interruption circuit; and momentarily interrupting power to an appliance attached to said power interruption circuit.

* * * * *